April 4, 1961 W. E. BAUER 2,977,990
DIFFERENTIAL PRESSURE RESPONSIVE APPARATUS
Filed Aug. 10, 1956
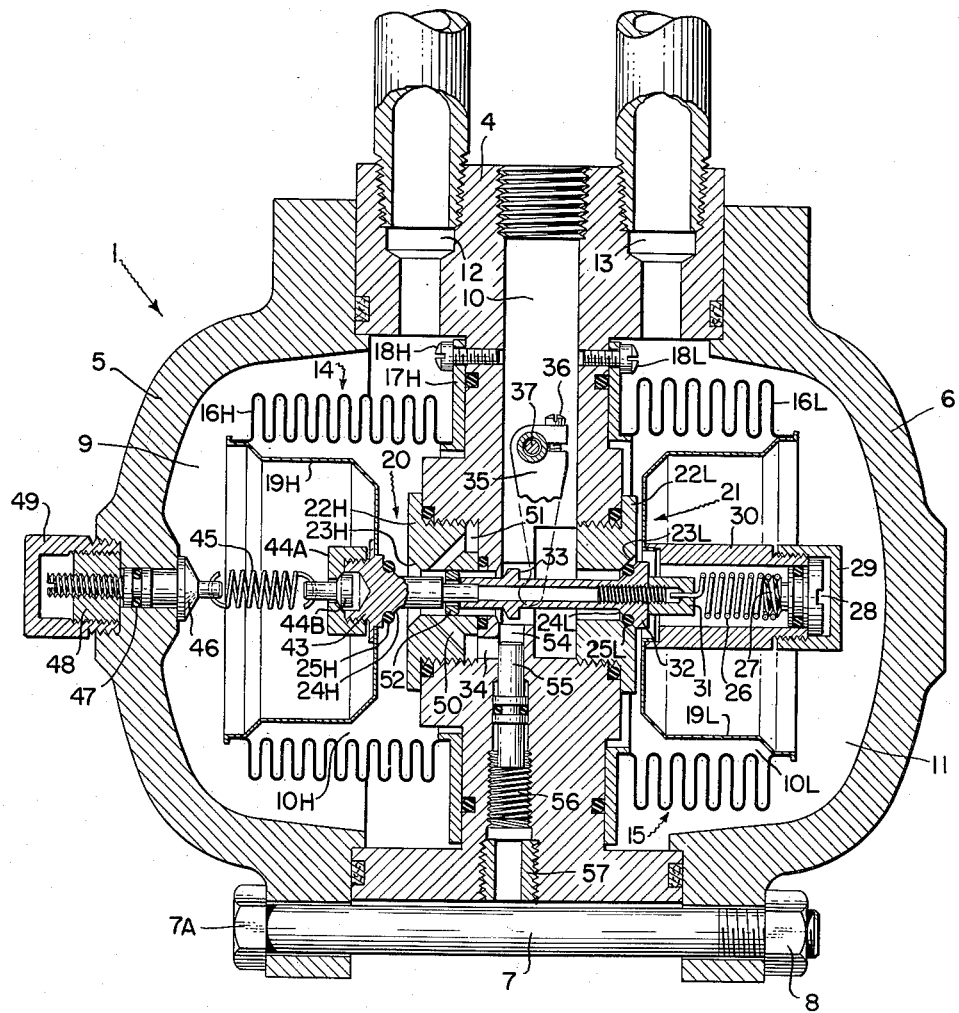
*INVENTOR.*
WILLIAM E. BAUER
BY Arthur H. Swanson
ATTORNEY.

United States Patent Office 2,977,990
Patented Apr. 4, 1961

2,977,990
DIFFERENTIAL PRESSURE RESPONSIVE APPARATUS

William E. Bauer, Palmyra, N.J., assignor to Minneapolis-Honeywell Regulator Company, Minneapolis, Minn., a corporation of Delaware Filed Aug. 10, 1956, Ser. No. 603,433

8 Claims. (Cl. 137—779)

This invention relates to means for indicating, recording, and/or controlling in response to a pressure, more specifically, in response to the difference between two pressures.

Devices such as this have many uses, particularly for measuring flow. In order that the device be as sensitive as possible, i.e., as responsive to small differences in pressure, it is necessary that the movable, pressure-responsive element be light. A common form of such a movable element is one or more thin-walled, metallic bellows. Such delicate structures must be protected against overload. In order to provide this protection against overload it is known to employ two of these bellows mounted on a rigid case in such a way as to define a closed chamber between them. This closed chamber is filled with a substantially incompressible liquid. A pair of valves are connected to the movable portion of one or both of the bellows and arranged to seat against a part of the rigid case. These valves are so arranged that, in the case of an excessive pressure applied to either of the bellows, one of the valves closes. This traps liquid in the interior of the bellows exposed to the excessive pressure. Since this liquid is substantially incompressible, and since the valve seats against a part of the rigid case, the sensitive bellows is protected against breaking due to overload by the liquid trapped within it.

In the prior art devices just described, it has been necessary to make the bellows as nearly alike as possible, i.e., to make the bellows of equal size and like spring characteristics.

It is an object of this invention to employ bellows which may differ more or less in size and to adjust the device for this difference in size of the bellows by providing a spring between the movable portions of the bellows and the output element. Since the bellows need not be matched as nearly as possible, the bellows can readily be made by mass production techniques and the need for stringent manufacturing tolerances is avoided.

In the prior art devices described above, it is necessary to compensate the device for the changes in static pressure or in ambient temperature. In the prior art, this compensation was usually achieved by the use of a separate chamber, such as a third bellows, into which the fluid expanded when heated.

It is a further object of this invention to compensate for changes in static pressure or ambient temperature without using a third bellows by the provision of two bellows of different size and of a stabilizing spring connected so as to counteract the movement of the bellows due to change in static pressure or ambient temperature. This movement would otherwise cause the device to give an erroneous indication.

A better understanding of the present invention may be had from the accompanying drawings and descriptive matter, in which:

Fig. 1 is a substantially vertical, longitudinal, cross section.

In that embodiment of this device selected for description in the specification and illustration in the drawings, a rigid case, generally indicated at 1, comprises a barrel 4 to which are secured end discs 5 and 6 by a plurality of bolts 7 having heads 7A thereon and nuts 8 screwed thereto. Barrel 4 has in its interior a hollow chamber 10, an inlet connection 12 for high pressure, and an inlet connection 13 for low pressure. Inlet connection 12 leads to a high pressure chamber 9 and inlet connection 13 leads to a low pressure chamber 11. A fill fluid comprising a substantially incompressible liquid can fill chamber 10 when poured thereinto while the screw-threaded plug between inlet connections 12 and 13 is removed. The plug is then replaced into the position shown in the drawing.

The active or movable, pressure-responsive element of the device is shown as comprising thin-walled, metallic bellows 14 and 15.

Since the active elements 14 and 15 are substantial duplicates a description of one will suffice. However, the operating characteristics (effective area and spring gradient) of active element 14 differ from those of active element 15 in such a way that no output error (i.e., force or motion) due to change in volume of the liquid in the chambers 10H, 10, and 10L will be transmitted from either active element to the output element of the device. The same reference characters are applied to the same parts of active elements 14 and 15 distinguished by H for the high pressure active element 14 or L for the low pressure active element 15.

Active element 14 comprises a bellows 16H which has a thin wall and is made of metal. Bellows 16H is sealed pressure-tight at its right hand end to case 1 by a ring 17H secured by screws 18H. The free or movable end of bellows 16H is secured to the rim of a cup 19H. Active element 14 separates high pressure chamber 9 from chamber 10H which forms the interior of the bellows 16H and communicates with chamber 10. Active element 15 separates chamber 11 from chamber 10L which forms the interior of the bellows 16L and communicates with chamber 10.

Between chamber 10 and chambers 10H and 10L, respectively, are interposed valves, generally indicated 20 and 21. Valves 20 and 21 serve to protect the active elements 14 and 15 from the destructive effect of excessive pressure applied thereto. Since valves 20 and 21 are substantial duplicates a description of one will suffice. The same reference characters will be applied to the same parts of each distinguished by H or L.

Valve 20 comprises a valve ring 22H screw threaded or otherwise fixedly mounted in barrel 4 of case 1. Valve ring 22H has a stationary valve seat 23H therein. Cooperating with stationary valve seat 23H is a movable valve face 24H sealed at its outer surface by an O-ring 25H.

The movement of active element 15 is transmitted to the output element by a mechanism now to be described. The movable cup 19L is connected at its center to a cylinder 30 which bears, at its opposite end, a cap 29 housing a screw 27 having a kerf or slot 28 in its head. Screw 27 is connected to a stabilizing spring 26. Screw 27 may be rotated manually to adjust the tension of spring 26 which is also connected to a connector 31 forming part of a rod 32 on which the movable valve face 24L is mounted.

Rod 32 also has, on its outer face, a flange 33 which transmits motion to the output element by bearing against a rounded face of a lever 35 secured by a screw 36 to the outer surface of a torque tube 37.

Torque tube 37 is connected to a torque rod which extends out of case 1. Such torque tubes are well known and need not be described in detail here.

Also connected to rod 32 is a second rod 43 on which the movable face 24H of valve 20 is mounted. Rod 43 is shown as connected to the center of cup 19H which forms the movable part of active element 14. However, the connection between active element 14 and the rod 43 may be omitted, if desired, since the movement of cup 19H can be transmitted to the output element through the liquid in chambers 10H, 10, and 10L.

Second rod 43 is connected by a universal joint 44A, 44B with a range spring 45 which is also connected to a screw 46 sealed in case 1 by O-ring 47. That portion of screw 46 which projects from case 1 has screw threaded or other adjustable engagement with a nut 48 and is housed within a cover 49. Screw 46 is rotatable manually to adjust the tension of spring 45.

Means are also provided to prevent transmitting small, unwanted changes in pressure to the output element. These means comprise a pulsation damper composed of a conduit 50 passing through valve ring 22H and connecting with a chamber 51 communicating with a conduit 34. A sealing ring 52 is mounted on rod 43 and permits the rods 32 and 43 to move relative to case 1 but seals chamber 10H from chamber 10 so that liquid can only be transmitted from chamber 10H to chamber 10 through the pulsation damper. Valve 55 is rotatable manually and controls the amount of opening between conduit 34 and conduit 54, which forms part of chamber 10. Valve 55 is mounted by screw threads 56 or other adjusting means in case 1. The outer end of valve 55 is sealed in case 1 by plug 57 which has screw threads or other adjustable engagement with case 1.

The operation of this device is as follows: Assume that the high pressure in chamber 9 is at a selected ratio to the low pressure in chamber 11 and that the device is therefore in stationary or balanced condition. Now assume a change in either of these pressures. This change is applied to cup 19L either directly or from cup 19L through the liquid in chambers 10H, 10, and 10L. This difference in pressure on the opposite sides of cup 19H causes torque tube 37 to rock by means of the engagement between flange 33 and lever 35. The torque tube 37 may actuate a pointer, a recording pen, or the actuating element of a controller, either directly or through an amplifying means well known in the art. These amplifying means may be mechanical, electric, or pneumatic, all being well known in the art.

This device is compensated for changes in static pressure or for changes in the temperature surrounding the device in the following way.

Let
$A_1$ equal the effective area of active element 14,
$A_2$ equal the effective area of active element 15,
$K_1$ equal the spring gradient of bellows 16H,
$K_2$ equal the spring gradient of bellows 16L, and
$K_c$ equal the spring gradient of stabilizing spring 26.
$F_1$ equals the tension in rod 32 after filling the chambers 10, 10H and 10L.
$P_f$ equals the pressure in the fill fluid in chambers 10, 10L and 10H.

A change in the static pressure applied to chamber 9 and to chamber 11 or a change in the ambient temperature surrounding the device will cause the volume occupied by the liquid in chambers 10H, 10, and 10L to change. Assume that the volume of the liquid increases. This increase in volume would tend to cause cup 19H to move to the left. This movement would produce an error in the output of the device. The movement of cup 19H to the left is not permitted to take place because of the corrective action of spring 26 as now to be explained. This corrective action is produced as follows. The increased pressure of the liquid in chamber 10L is applied to bellows 16L and tends to move cup 19L to the right. Cup 19L moves to the right and stretches stabilizing spring 26. The operating characteristics (effective area and spring gradient) are such that this movement of cup 19L to the right increases the tension of stabilizing spring 26. The movement of cup 19H to the left is thus prevented.

The mathematical relationship (which must be satisfied for the above statement to hold) is as follows:

As the volume of the fill fluid expands, the active element 19L, which is exposed to the low pressure, moves a distance $y$. The sum of the horizontal forces at elements 43, 31 and 30, when the system is in equilibrium, is as follows:

At 43: $F_1 = (P_f)(A_1)$     (1)
At 32: $F_1 = (K_c)(y)$     (2)
At 30: $(K_c)(y) + (K_2)(y) = (P_f)(A_2)$     (3)

rearranging (3):

$$P_f = \frac{(K_c)(y) + (K_2)(y)}{A_2} \quad (4)$$

substituting (2) and (4) into (1)

$$(K_c)(y) = \left[\frac{(K_c)(y) + (K_2)(y)}{A_2}\right][A_1]$$

collecting the terms $$(K_c)(y) = (A_1/A_2)(K_c)(y) + (A_1/A_2)(K_2)(y)$$

cancelling $y$ $$K_c = (A_1/A_2)(K_c) + (A_1/A_2)(K_2)$$

transposing $$K_c - (A_1/A_2)(K_c) = (A_1/A_2)(K_2)$$
$$(K_c)(1 - A_1/A_2) = (A_1/A_2)(K_2)$$

solving for $K_c$ $$K_c = (A_1)(K_2)/(A_2 - A_1)$$

By making $K_c$ equal to $K_2$ multiplied by the quantity $A_1$ divided by $A_2$ minus $A_1$, the tendency of cup 19L to move to the right is counterbalanced by the increased tension of stabilizing spring 26. Therefore, no force is applied to the rod 32 and, consequently, no force is applied to the output element. By proper design of the spring gradient $K_c$ the force applied by the expansion of the liquid in chambers 10H, 10, and 10L can be cancelled by the force of the expanded stabilizing spring 26. No output error (i.e., force or motion) will be imposed on the output element of the device due to change in volume of the liquid in the chambers 10H, 10, and 10L.

What is claimed is:

1. A device responsive to the difference between two pressure, including, a rigid case having a pair of inlet connections passing through the wall thereof and an intermediate chamber therein adapted to contain a substantially incompressible liquid in it, a first active element separating one of said inlet connections from said intermediate chamber, a second active element separating the other of said inlet connections from said intermediate chamber and having an operating characteristic different from that of said first active element, a stabilizing spring connected to the movable portion of said second active element and expansible so as to stabilize the device against the change in volume of said liquid by causing said first active element to remain stationary, a rod connected to said stabilizing spring at a point spaced from the connection between said stabilizing spring and said second active element and connected to and movable with said first active element, and an output element extending through a wall of said case and having an inner portion located inside said case and in engagement with said rod.

2. A device responsive to the difference between two pressures, including, a rigid case having a pair of inlet connections passing through the wall thereof and an intermediate chamber therein adapted to contain a substantially incompressible liquid in it, a first thin-walled metallic bellows separating one of said inlet connections from said intermediate chamber, a second thin-walled metallic bellows separating the other of said inlet connections from said intermediate chamber and having an operating characteristic different from that of said first bellows, a stabilizing spring connected to said second bellows and expansible so as to stabilize the device against the change in volume of said liquid by causing said first bellows to remain stationary, a rod connected to a portion of said stabilizing spring remote from the connection between said spring and said bellows and rigidly connected to and movable with said first bellows, and an output element extending through a wall of said case and having an inner portion located in the interior of said case and in engagement with said rod.

3. Means for compensating a differential-pressure-responsive device against changes in the static pressure applied thereto or changes in the surrounding temperature, including, a rigid case divided into a high pressure chamber and a low pressure chamber and an intermediate chamber adapted to contain a substantially incompressible liquid in it by a pair of active elements each having an operating characteristic different from that of the other, and a compensating spring connected to said active elements and to the output element of the meter in such a way as to oppose the increase in force applied to said active element by a change in static pressure or a change in the surrounding temperature.

4. Means for compensating a differential-pressure-responsive device against changes in the static pressure applied thereto or changes in surrounding temperature, including, a rigid case having a hollow interior, an output element passing through the wall of said case and movably mounted and sealed pressure tight therein, a first thin-walled metallic bellows dividing the interior of said case into a chamber connected to one of said pressures and an intermediate chamber, a second thin-walled metallic bellows having a different area from that of said first bellows and dividing said intermediate chamber from a chamber in the interior of said case and connected to the other of said pressures, said intermediate chamber being adapted to contain a substantially incompressible liquid in it, and a stabilizing spring connected between the movable portion of said first bellows and of said second bellows in such a way that an increase in the force of said stabilizing spring arising from the change in volume of said fill fluid opposes the increase in force applied to said first bellows by the change in said fluid volume due to a change in static pressure or in the temperature surrounding said meter.

5. Means for stabilizing a device responsive to the difference between two pressures against errors otherwise tending to be caused by changes in volume of a fill fluid in the device due to changes in static pressure applied to the device or in the temperature surrounding it, which means include, a rigid case having a hollow interior, a first movable active element in the interior of said case and separating a chamber connected to one of said pressures from an intermediate chamber, a second movable active element in the interior of said case and having an operating characteristic different from that of said first active element and separating said intermediate chamber from a chamber connected to the other of said pressures, said intermediate chamber being filled with a fill fluid, the difference between the operating characteristics of said active elements causing said second active element to move differently in response to a change in volume of said fill fluid than said other active element, an output element passing through the wall of said case and movable and sealed pressure tight therein and connected inside of said case to said first active element for movement therewith, and a stabilizing spring connected between said second active element and said first active element whereby changes in force of said stabilizing spring applied to said first active element, caused by change in volume of said fill fluid, will substantially balance the change in pressure force resulting from said change in volume which said fill fluid imposes upon said first active element in consequence of which there is substantially no motion of said first active element due to change in volume of said fill fluid.

6. A device according to claim 5 in which said first active element has a spring gradient $K_1$ and an effective area $A_1$, said second active element has a spring gradient $K_2$ and an effective area $A_2$, said stabilizing spring has a spring gradient $K_c$, and said balance of forces which arise from changes in the volume of said fluid fill occurs when the following formula is satisfied:

$K_c = K_2$ multiplied by the quantity $A_1$ divided by $A_2$ minus $A_1$.

7. Means for stabilizing a device responsive to the difference between two pressures against changes in the static pressure applied thereto or changes in surrounding temperature, said device including, a rigid case having a hollow interior, a first thin-walled metallic bellows having a movable portion dividing the interior of said case into a chamber connected to one of said pressures and an intermediate chamber, a second thin-walled metallic bellows having a movable portion of a different effective area from that of said first bellows and dividing said intermediate chamber from a chamber in the interior of said case and connected to the other of said pressures, said intermediate chamber being adapted to contain a fill fluid in it, an output element passing through the wall of said case and movably mounted and sealed pressure tight therein and connected in said case to said first bellows, and a stabilizing spring connected between the movable portion of said first bellows and of said second bellows so that an increase in the force of said stabilizing spring arising from the change in volume of said fill fluid opposes the increase in force applied to said first bellows by the change in said volume of said fill fluid due to a change in static pressure or in the temperature surrounding said meter.

8. A device responsive to the difference between two pressures, including a rigid case having a pair of inlet connections passing through the wall thereof and an intermediate chamber therein adapted to contain liquid in it, a first active element separating one of said inlet connections from said intermediate chamber, a second active element separating the other of said inlet connections from said intermediate chamber and having a greater effective area than said first active element and being more readily movable than said first active element so as to compensate for change in volume in said liquid because of change in static pressure or in ambient temperature, a rod rigidly connected to said first active element, a flexible connection between said rod and said second active element, and an output element extending through a wall of said case and having an inner portion located inside said case and in engagement with said rod and not rigidly connected to said second active element.

References Cited in the file of this patent

UNITED STATES PATENTS

| | | |
|---|---|---|
| 2,400,048 | Jones | May 7, 1946 |
| 2,590,324 | Jones | Mar. 25, 1952 |
| 2,632,474 | Jones | Mar. 24, 1953 |
| 2,659,390 | MacLea | Nov. 17, 1953 |
| 2,664,749 | Jones | Jan. 5, 1954 |
| 2,705,021 | Wiley | Mar. 29, 1955 |
| 2,747,614 | Gray | May 29, 1956 |
| 2,762,391 | Reese | Sept. 11, 1956 |
| 2,762,392 | Reese | Sept. 11, 1956 |